United States Patent Office 3,285,024
Patented Nov. 15, 1966

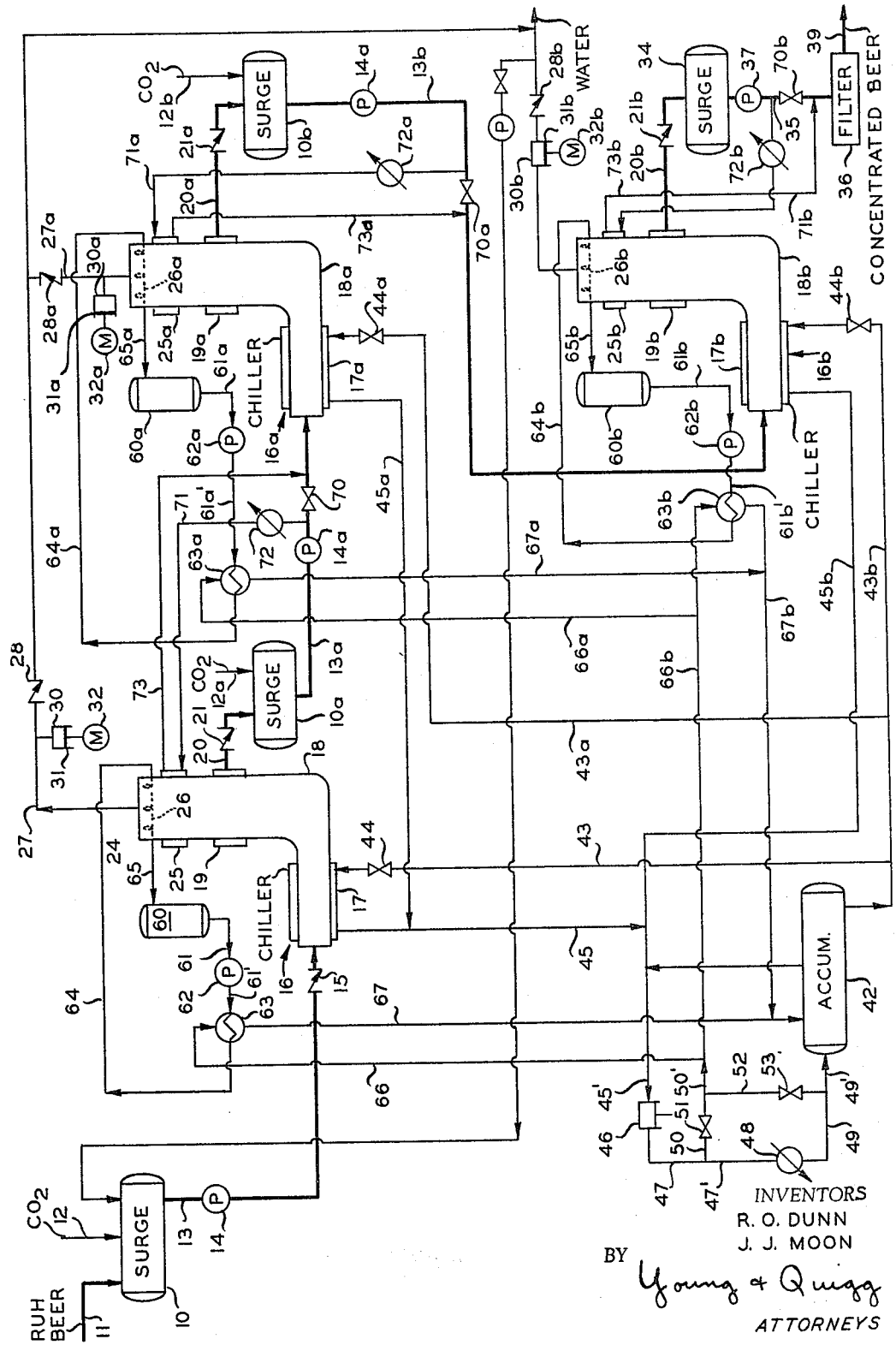

3,285,024
CRYSTAL MELTING WITH HEAT PUMP AND HEATED MOTHER LIQUID
Robert O. Dunn and John J. Moon, Bartlesville, Okla., assignors to Phillips Petroleum Company, a corporation of Delaware
Filed Dec. 16, 1963, Ser. No. 330,986
4 Claims. (Cl. 62—58)

This invention relates to the separation of materials by means of fractional crystallization.

Fractional crystallization has been employed in recent years as a method of separating materials which are difficult to separate by other known procedures, such as fractional distillation or solvent extraction. Fractional crytallization is particularly useful in concentrating food products and beverages which are in the form of aqueous solutions. In this field, concentration by crystallization represents a considerable improvement over evaporative pressures. This is due to the fact that removal of water pressures. This is due to the fact that removal of water by evaporation often results in the loss of essential oils and esters so that the concentrated product can never be restored to its original freshness and flavor.

In one particular method of separating materials by fractional crystallization, the feed mixture is cooled in a chiller to form a slurry of crystals and mother liquor. This slurry is directed into a purification zone in which the crystals are passed as a compact mass through a body of crystal melt which is displaced back through the crystal mass. The purification zone includes a liquid removal zone, a reflux zone and a melting zone. Mother liquor is removed from the crystals in the liquid removal zone, and the crystals are melted in the melting zone. A portion of the crystal melt is withdrawn from the melting zone, and the remainder is forced back into the crystal mass as reflux.

In most operations of this type it is important to prevent contamination of the materials being separated. This is particularly true when beverages are being concentrated. One potential source of contamination is leakage of heating fluid from heating coils positioned in the melting zone of the separation column. This often occurs because the coils are subjected to considerable stress due to impingement of a vibrating crystal mass. For economy of operation, it is often desirable to employ the same material to refrigerate the chiller and heat the melting zone. This is readily accomplished by the use of a volatile refrigerant in the chiller. The spent vapors from the chiller are compressed, and heat is removed by passing the compressed vapors through the heating coil in the column. The refrigerant normally employed in such an operation is either ammonia or a volatile hydrocarbon such as propane. However, it is readily apparent that many beverages and other products must be kept free of these refrigerants.

In accordance with one aspect of this invention, a two stage refrigeration and heating system is employed in a fractional crystallization system. A heating fluid which is compatible with the materials being separated is circulated through the heating coil in the column. In the concentration of beer, for example, this heating fluid can advantageously be a mixture of water and alcohol (ethanol). The necessary heat is supplied to this fluid by passing spent refrigerant from the chiller in indirect heat exchange relationship with the column heating fluid. This two stage system thus eliminates the danger of contamination of the products by conventional volatile refrigerants. In another aspect of this invention, additional heat is supplied to the melting zone by passing a portion of the mother liquor in heat exchange relationship with the melting zone of the column.

Accordingly, it is an object of this invention to provide improved procedures for separating materials by fractional crystallization.

Another object is to provide improved refrigeration and heating systems for use in separation processes.

A further object is to provide an improved system for concentrating beer.

Other objects, advantages and features of the invention should become apparent from the following detailed description, taken in conjunction with the accompanying drawing which is a schematic representation of apparatus employed to carry out the process of this invention.

For purposes of illustration, the invention will be described in conjunction with the concentration of beer. Referring now to the drawing in detail, ruh beer to be concentrated is introduced into a feed surge tank 10 from an inlet conduit 11. Carbon dioxide or other inert gas in introduced into tank 10 through a conduit 12 in order to maintain the system under a pressure greater than atmospheric. A pressure in the range of 25 to 30 pounds per square inch absolute can be employed to advantage. This prevents leakage of air into the system, which may have an adverse effect on the beer. In the specific example being described, beer is introduced into tank 10 at a temperature of about 40° F. The beer is removed from feed surge tank 10 through a conduit 13 which has a pump 14 and a check valve 15 therein. Conduit 13 delivers the beer to the inlet of a scraped surface chiller 16 which is provided with a jacket 17 for the circulation of refrigerant. The beer is cooled in chiller 16 to provide a slurry of ice crystals. This slurry is introduced directly into a fractional crystallization column 18.

As the slurry moves upwardly through column 18, mother liquor is removed through a filter 19 which is disposed in an intermediate region of the column. This mother liquor is withdrawn through a conduit 20, which has a check valve 21 therein, and is introduced into a second feed surge tank 10a at a temperature of about 26.5° F. The ice crystals continue to move as a compact mass upwardly through column 18 into a melting zone 24. Heat is supplied to melting zone 24 from two sources, the first being an external jacket 25 through which a heating fluid is circulated. A coil 26 is disposed directly within the melting zone to provide the second heat source. A portion of the resulting melt, which is relatively pure water at a temperature of approximately 60° F., is removed from column 18 through an outlet conduit 27 which has a check valve 28 therein. A pulsing device is connected to conduit 27 upstream from check valve 28. This pulsing device comprises a cylinder 30 having a piston 31 therein which is reciprocated by a motor 32. The purpose of the pulsing device is to displace the ice mass back and forth within the column to provide more efficient contacting of the ice crystals with the melt which remains in the column. The operation of such a pulsing device is described in detail in U.S. Patent 2,854,494.

The mother liquor directed to surge tank 10a thus comprises a concentrated beer. In many operations, it is desirable to concentrate this beer to a greater extent than can be done economically in a single column. For this reason, the concentrated beer can be directed through two additional crystallization columns which are similar to the one previously described. These additional columns and associated components are designated by corresponding a and b reference characters. The concentrated beer removed from column 18b is delivered to a surge tank 34 at a temperature of about 17.6° F. The final concentrated beer is passed by a conduit 35, which has a pump 37 and a valve 70b therein, to a filter 36. Filter 36 removes any precipitated solids from the beer so that a clarified concentrated beer is removed through a product conduit 39. The concentration and filtering steps provided by the apparatus described can serve to replace the conventional lagering step in the conventional brewing of beer.

In the specific example being described, ammonia is employed as the refrigerant to cool the beer in the chillers. Ammonia is removed from an accumulator 42 through a conduit 43, which has an expansion valve 44 therein, and introduced into the inlet of chiller jacket 17. The spent refrigerant is removed through a conduit 45 which communicates with the inlet of a compressor 46. A conduit 47 directs a portion of the compressed refrigerant vapors to the inlet of a condenser 48. A portion of the resulting condensate is returned to accumulator 42 into a conduit 49. The remainder of the compressed vapors from compressor 46 is transmitted through a conduit 50 which has a valve 51 therein. A portion of the condensate is passed from conduit 49 to conduit 50 through a conduit 52 which has a valve 53 therein. As an alternative, the refrigerant can be passed through jacket 17 as a liquid and then expanded into a flash chamber. The resulting vapors can then be compressed, and the liquid recirculated, as by means of a pump.

A mixture of alcohol and water is employed to supply heat to coil 26 in column 18. This mixture is passed from a surge tank 60 through a conduit 61, which has a pump 62 therein, to the inlet of a heat exchanger 63. The alcohol-water mixture is elevated in temperature in heat exchanger 63 and passed through a conduit 64 to the inlet of coil 26. A conduit 65 returns the mixture from coil 26 to surge tank 60. Heat is supplied to exchanger 63 from the compressed ammonia vapors by means of a conduit 66 which communicates between conduit 50 and heat exchanger 63. The resulting cooled ammonia is directed from heat exchanger 63 to accumulator 42 through a conduit 67.

Chillers 16a and 16b are likewise cooled by ammonia from accumulator 42, and the fluids passed through coils 26a and 26b are heated from the compressed ammonia vapors.

As previously mentioned, column 18 is also supplied with heat by means of jacket 25. A portion of the mother liquor from column 18 is employed as the heat exchange fluid in this jacket. To this end, a valve 70 is disposed in conduit 13a downstream from pump 14a. A conduit 71 conveys a portion of the mother liquor to the inlet of jacket 25. A heater 72 is disposed in conduit 71 to elevate the temperature of this liquid to about 37° F. A conduit 73 returns the spent heating liquid at a temperature of about −32° F., to conduit 13a downstream from valve 70. Jackets 25a and 25b are heated in a similar fashion. Fluid is supplied to jacket 25a at about 33° F., and is removed at about 28° F. Fluid is supplied to jacket 25b at about 28° F., and is removed at about 23° F.

Typical operating conditions for the beer concentration process being described are set forth in the following table.

Typical operating conditions of the combined ammonia cooling and heating system are as follows:

| Conduit | Temperature, °F. | Pressure, p.s.i.a. | Flow, Pounds Per Hour |
|---|---|---|---|
| 42 | 110 | 246 | |
| 45' | 13 | 40 | 1,710 |
| 47 | 315 | 255 | |
| 47' | 315 | 255 | 664 |
| 49 | 111 | 250 | |
| 52 | 111 | 250 | 310 |
| 49' | 111 | 250 | 354 |
| 50 | 315 | 255 | 1,046 |
| 50' | 111 | 250 | 1,356 |
| 43 | 110 | 246 | 885 |
| 45 | 17 | 45 | 885 |
| 43a | 110 | 246 | 500 |
| 45a | 15 | 43 | 500 |
| 43b | 110 | 246 | 325 |
| 45b | 14 | 42 | 325 |
| 66 | 111 | 250 | 696 |
| 67 | 110 | 246 | 696 |
| 66a | 111 | 250 | 408 |
| 67a | 110 | 246 | 408 |
| 66b | 111 | 250 | 252 |
| 67b | 110 | 246 | 252 |

Typical operating conditions of the alcohol-water heating systems for the columns are as follows:

| Conduit | Flow, Gallons Per Minute | Temperature, °F. | Pressure, p.s.i.a. |
|---|---|---|---|
| 61' | | 81 | 110 |
| 64 | 46 | 95 | |
| 60 | | 80 | 15 |
| 61a' | | 71 | 130 |
| 64a | 27 | 85 | |
| 60a | | 70 | 15 |
| 61b' | | 65 | 80 |
| 64b | 17 | 79 | |
| 60b | | 64 | 15 |

The amount of alcohol (ethanol) employed need be only sufficient to prevent freezing, particularly during start-up.

While the invention has been described in conjunction with a presently preferred embodiment, it should be evident that it is not limited thereto.

What is claimed is:

1. In a process for separating a fluid mixture wherein the mixture is cooled to crystallize a portion thereof to form crystals and uncrystallized mother liquor, the crystals and mother liquor are passed through a filtration zone to remove mother liquor, the remaining crystals are passed through a purification zone to a melting zone wherein crystals are melted, a portion of the resulting melt is removed, and the remainder of the crystal melt is passed back into the crystals in the purification zone; a combined cooling and heating process which comprises passing a volatile liquid refrigerant in heat exchange relationship with the fluid mixture to provide cooling of the mixture, passing at least a portion of the spent refrigerant in heat exchange relationship with a heating fluid to warm the heating fluid and cool the refrigerant, passing the resulting warmed heating fluid in heat exchange relationship with crystals in the melting zone to provide heat to melt crystals, heating a portion of the mother liquor removed from the filtration zone, and passing the thus heated mother liquor in heat exchange relationship with crystals

*Conduit number (flows in pounds per hour)*

| Component | 11 | 18 (Feed) | 13a | 27 | 18a (Feed) | 13b | 27a | 18b (Feed) | 35 | 27b |
|---|---|---|---|---|---|---|---|---|---|---|
| Ethanol | 187 | 187 | 186 | 1 | 186 | 185 | 1 | 185 | 179 | 6 |
| Sugars | 260 | 260 | 258 | 2 | 258 | 256 | 2 | 256 | 248 | 8 |
| H₂O (Liquid) | 4,753 | 2,852 | 2,852 | 1,901 | 1,711 | 1,711 | 1,141 | 1,027 | 1,027 | 684 |
| H₂O (Solid) | | 1,901 | | | 1,141 | | | 684 | | |
| Temperature, °F | 40 | 26.5 | 26.5 | 60 | 22.8 | 22.8 | 60 | 17.6 | 17.6 | 60 | in the melting zone to provide additional heat to melt crystals.

2. The process of claim 1 wherein the fluid mixture comprises beer and the heating fluid comprises a mixture of water and ethanol.

3. In a system for separating fluid mixtures comprising a chiller having a jacket; a purification column having an inlet at one end, a first outlet at the opposite end, a second outlet intermediate the ends to remove mother liquor, filter means in said second outlet, and a heating coil positioned adjacent the first outlet; and means connecting said chiller to the inlet of said column; a combined cooling and heating system comprising a tank adapted to contain a volatile liquid refrigerant, first conduit means communicating between said tank and said jacket to supply refrigerant to the jacket, a compressor, second conduit means communicating between said jacket and the inlet of said compressor to direct refrigerant vapors to said compressor, a heat exchanger, third conduit means to circulate a liquid in a closed loop between said heating coil and said heat exchanger, fourth conduit means to circulate compressed vapors from the outlet of said compressor through said heat exchanger to said tank, a second jacket on said column adjacent said heating coil, fifth conduit means communicating between said second outlet and said second jacket to circulate at least a portion of the liquid removed from said column through said second outlet through said second jacket, and heating means in said fifth conduit means.

4. In a system for separating fluid mixtures, including first and second crystallizing and purification units, each of said units comprising (1) a chiller having a first cooling jacket, (2) a purification column having an inlet at one end, a first outlet at the other end, a second outlet intermediate said ends, filter means in said second outlet, a heating coil adjacent the first outlet, and a second cooling jacket on said column adjacent said one end, and (3) means connecting said chiller to the inlet of said column; first conduit means connecting said second outlet of the column of said first unit with the inlet of the chiller of said second unit; and a surge tank in said first conduit means; a combined cooling and heating system comprising a second tank adapting to contain a voltatile liquid refrigerant, second conduit means communicating between said second tank and said first jackets to supply refrigerant to said jackets, a compressor, third conduit means communicating between said first jackets and the inlet of said compressor to pass spent refrigerant vapors to said compressor, first and second heat exchangers, fourth conduit means to circulate a liquid in a closed loop between the heating coil of the first unit and said first heat exchanger, fifth conduit to circulate a liquid in a closing loop between the heating coil of the second unit and said second heat exchanger, sixth conduit means to circulate compressed vapors from the outlet of said compressor through said first and second heat exchangers and then to said second tank, seventh conduit means communicating between the second outlet of said first unit and the second jacket of said first unit to circulate at least a portion of the liquid removed from such outlet through the second jacket of said first unit, heating means in said seventh conduit means, eighth conduit means communicating between the second outlet of said second unit and the second jacket of said second unit to circulate at least a portion of the liquid removed from such outlet through the second jacket of said second unit, and heating means in said eighth conduit means.

References Cited by the Examiner
UNITED STATES PATENTS

| | | |
|---|---|---|
| 2,890,962 | 6/1959 | Eddy. |
| 3,017,751 | 1/1962 | Hawkins _____ 62—58 |
| 3,073,131 | 1/1963 | Ashley _____ 62—58 |
| 3,132,096 | 5/1964 | Walton _____ 62—58 X |
| 3,150,500 | 9/1964 | Goard _____ 62—58 X |

FOREIGN PATENTS 841,374   7/1960   Great Britain.

NORMAN YUDKOFF, *Primary Examiner.*